United States Patent
Stellwagen

(10) Patent No.: US 9,238,999 B2
(45) Date of Patent: Jan. 19, 2016

(54) DEVICE AND METHOD FOR REGULATING A SPARK-IGNITION GAS ENGINE

(75) Inventor: Karl Stellwagen, Frankenthal (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 14/238,096

(22) PCT Filed: Aug. 7, 2012

(86) PCT No.: PCT/EP2012/065442
§ 371 (c)(1),
(2), (4) Date: Feb. 10, 2014

(87) PCT Pub. No.: WO2013/023957
PCT Pub. Date: Feb. 21, 2013

(65) Prior Publication Data
US 2014/0182288 A1    Jul. 3, 2014

(30) Foreign Application Priority Data

Aug. 12, 2011 (DE) .......................... 10 2011 110 073
Sep. 14, 2011 (DE) .......................... 10 2011 113 145

(51) Int. Cl.
F02B 33/44 (2006.01)
F02D 23/00 (2006.01)
F02B 37/22 (2006.01)
F02B 37/12 (2006.01)
(Continued)

(52) U.S. Cl.
CPC ................. *F02B 37/22* (2013.01); *F02B 37/12* (2013.01); *F02B 43/00* (2013.01); *F02B 69/04* (2013.01);
(Continued)

(58) Field of Classification Search
CPC .......... F02B 37/12; F02B 37/22; F02B 43/00; F02D 41/0007; F02D 41/0027; Y02T 10/144

USPC ..................................................... 60/602, 611
See application file for complete search history.

(56) References Cited

U.S. PATENT DOCUMENTS 4,248,047 A     2/1981 Sumi
2012/0204570 A1  8/2012 Herdin

FOREIGN PATENT DOCUMENTS

DE           10315148 A     11/2004
DE       102006024782 A1   11/2007
(Continued)

OTHER PUBLICATIONS

English translation of International Search Report for parent PCT application No. PCT/EP2012/065442.
(Continued)

*Primary Examiner* — Thai Ba Trieu
*Assistant Examiner* — Ngoc T Nguyen
(74) *Attorney, Agent, or Firm* — J-Tek Law PLLC; Jeffrey D. Tekanic; Scott T. Wakeman

(57) ABSTRACT

A protective device for a spark-ignition gas engine is provided, which engine has a throttle valve for controlling a gas/air mixture and has an exhaust-gas turbocharger with a turbine that is associated with a throttle member for exhaust gas. A detection unit is configured to detect an actual differential pressure across the throttle valve, and a control unit is configured to change the position of the throttle member based on the actual differential pressure. The throttle member for the exhaust gas is provided only downstream of the turbine in relation to the flow direction of the exhaust gas. A method for regulating an exhaust-gas throttle member, connected downstream of a turbine of an exhaust-gas turbocharger, is also disclosed.

13 Claims, 2 Drawing Sheets

(51) Int. Cl.
   *F02B 43/00* (2006.01)
   *F02B 69/04* (2006.01)
   *F02D 41/00* (2006.01)
   *F02D 9/02* (2006.01)

(52) U.S. Cl.
   CPC ........ *F02D 41/0007* (2013.01); *F02D 41/0027* (2013.01); *F02D 2009/0228* (2013.01); *Y02T 10/144* (2013.01); *Y02T 10/32* (2013.01)

(56) References Cited

FOREIGN PATENT DOCUMENTS

| DE | 102006042443 A | 3/2008 | | |
|---|---|---|---|---|
| DE | 102009049394 A | 4/2011 | | |
| DE | 102010032171 A1 | * | 1/2012 | ............ F02M 25/07 |
| GB | 1140909 A | 1/1969 | | |
| JP | 2003193896 A | 7/2003 | | |
| WO | 2008032187 A | 3/2008 | | |
| WO | WO2014094807 A1 | * | 6/2014 | ............... F02D 9/04 |

OTHER PUBLICATIONS

English translation of Written Opinion for parent PCT application No. PCT/EP2012/065442.

Office Action from the Chinese Patent Office dated Sep. 2, 2015 in counterpart Chinese application No. 201280044067.4, including English summary.

* cited by examiner

DEVICE AND METHOD FOR REGULATING A SPARK-IGNITION GAS ENGINE

CROSS-REFERENCE

This application is the U.S. National Stage of International Application No. PCT/EP2012/065442 filed on Aug. 7, 2012, which claims priority to German patent application no. 10 2011 110 073.7 filed on Aug. 12, 2011, and German patent application no. 10 2011 113 145.4 filed on Sep. 14, 2011.

TECHNICAL FIELD

The present disclosure is directed to a protective device for a spark-ignition gas engine that has a throttle valve for a gas-air mixture GL and an exhaust-gas turbocharger. The turbocharger includes a turbine and has an associated throttle element for exhaust gas A. A detection unit is provided for detecting an actual pressure difference Δp across the throttle valve, and a control unit is provided for varying the position of the throttle element as a function of the actual pressure difference Δp.

During the operation of a supercharged spark-ignition engine, in particular of a gas engine with different fuels or mixtures thereof, the charge pressure upstream of the throttle valve varies, while the mixture pressure upstream of the cylinder remains approximately constant when the fuels have different combustion characteristics, such as for example natural gas and biogas. This is because, in the case of gas engines, the exhaust-gas temperature upstream of the turbine of the turbocharger rises due to the different combustion characteristics. As a result, the compressor power also rises, and a higher charge pressure than is necessary is generated.

BACKGROUND

In the gas engine, an excessively high charge pressure leads to an increase in the pressure difference across the throttle valve, because the pressure required upstream of the cylinder head, or downstream of the throttle valve, for operation at constant power remains approximately constant.

If a threshold value of the pressure difference across the throttle valve is exceeded, the compressor of the turbocharger reaches the surge line. In the case of modern turbochargers with "narrow characteristic maps", a very high pressure difference leads to "surging". Surging refers to an instability in the volume flow rate delivered by the compressor, which in turn, due to other side-effects, can lead to system failures and to turbocharger damage and engine damage.

To avoid this, solutions are known which regulate the pressure difference across the throttle valve by using a bypass at the compressor or a bypass at the turbine of the turbocharger.

For example, an internal combustion engine having an exhaust-gas turbocharger is also already known from DE 103 15 148 A1. A bypass line or a bypass, which connects the primary side to the secondary side, is associated with the exhaust-gas turbocharger. To prevent surging of the compressor, it can be equipped with internal recirculation. Recirculation means that air or air mixture is recirculated from the secondary side of the compressor to the primary side of the compressor. This recirculation can also be configured in a switchable manner.

A device for a spark-ignition gas engine is known from DE 10 2009 049 394 A1, which device includes on the one hand a throttle valve as well as a detection unit for the pressure difference across the throttle valve, and on the other hand includes a throttle element in a bypass line of the exhaust-gas turbine for the purpose of regulating the volume flow rate in the bypass line.

SUMMARY

One aspect of the present disclosure is to develop and arrange a control device such that surging of the compressor is prevented in a simple manner.

In particular in the case of older engines or engines that were installed without this equipment, in particular without a bypass line, retrofitting is highly cumbersome, expensive and/or impossible, because entire parts of the exhaust system and fresh-air system would have to be newly designed and exchanged.

According to the disclosure, the throttle element for the exhaust gas A is provided only downstream of the turbine with respect to the flow direction of the exhaust gas A. A bypass line is not provided. In this case, the detection unit can be reduced to the detection of the pressures or the valve position, and the control unit performs the evaluation and/or calculation of the actual pressure difference Δp. The pressures are thus either directly detected or are determined using the position of the throttle valve as a function of the actual pressure difference. The throttle element or the exhaust-gas valve influences the exhaust-gas back pressure at the turbine of the exhaust-gas turbocharger by assuming different positions. By measuring the charge pressure or the mixture pressure upstream and downstream of the throttle valve and/or by detecting the position of the throttle valve, the actual pressure difference across the throttle valve can be directly determined or derived. In a simple controller, the measured pressure difference is compared with a parameterizable and storable target value. In the event of deviations from the target value, an actuating signal is transmitted to the exhaust-gas valve in the exhaust system or to the corresponding actuator until the desired target pressure difference across the throttle valve is achieved. Overall, by throttling, the power of the turbine of the turbocharger can be reduced by a reduced pressure gradient between the inlet and the outlet, and thus also the charge pressure upstream of the throttle valve can be reduced and surging thus prevented.

In this way, damage to the system and to the engine during operation with different fuel qualities and/or gas compositions, or under variable environmental conditions which have an influence on the intake temperature, can be avoided.

This solution can be retrofitted to substantially any system, regardless of engine manufacturer and without intrusion into the engine architecture or the existing engine control regime. The exhaust-gas valve, as a typical throttle element, can be retrofitted in a simple manner. If there is already an exhaust-gas valve for a bypass and/or an exhaust-gas heating boiler system, it is also possible for one of these two throttle elements to be used. For this purpose, all that is required is the detection of the actual pressure difference Δp across the throttle valve and corresponding regulation of the throttle element.

It is expedient for the pressure difference across the throttle valve to be taken into consideration for the control and/or the configuration of the exhaust-gas valve.

Adjustable exhaust-gas valves are also suitable for intensely fluctuating environmental conditions such as the intake temperature, because this likewise has a great influence on the charge pressure and/or the pressure difference. The disclosure thus relates to a protective device for a spark-ignition gas engine that has a throttle valve for gas-air mixture GL and an exhaust-gas turbocharger. The turbocharger includes a turbine and a throttle element for the exhaust gas A is provided only downstream of the turbine with respect to the flow direction of the exhaust gas A. A detection unit is provided for detecting an actual pressure difference $\Delta p$ across the throttle valve, and a control unit is provided for varying the position of the throttle element as a function of the actual pressure difference $\Delta p$.

For this purpose, it can also be advantageous if the detection unit includes two pressure sensors P1, P2 for determining the actual pressure difference $\Delta p$ across the throttle valve or is formed as a sensor unit for determining the position of the throttle valve. The pressure difference across the throttle valve can also be calculated in the control unit and/or the CPU if the individual pressures are measured. This measurement is also possible with a pressure difference sensor. Alternatively, it would also be possible to use the throttle valve position as a measure for the actual pressure difference, i.e. the throttle element or the position of the exhaust-gas valve can also be determined as a function of the opening of the throttle valve, because the degree of opening is dependent on the pressure difference across the throttle valve. In this case, the target value for the regulation is the throttle valve position or the position of the throttle valve actuator, which is detected by the detection unit.

It may furthermore be advantageous if the throttle element includes an actuator and is formed as an exhaust-gas valve or an exhaust-gas slide valve. Typical valves can be easily provided with an actuator, by which the position of the throttle element is variable. The adjustment of the throttle element or the exhaust-gas valve can take place electrically, hydraulically or pneumatically.

Alternatively, it can also be provided that the throttle element is formed as an exhaust-gas aperture. In the case of a known and consistent gas composition and a very constant intake temperature, it is also possible for an exhaust-gas aperture to be provided which is adapted to these conditions, which exhaust-gas aperture is inserted between two flanges of the exhaust-gas system. However, in the event of a significant change in the gas composition, it would have to be exchanged in a suitable manner. The regulating elements and/or control elements are thus not required. The detection of the actual pressure difference is however of importance in any case.

Also disclosed is a method for regulating an exhaust-gas throttle element. The throttle element is connected downstream of a turbine of an exhaust-gas turbocharger of a spark-ignition gas engine having a throttle valve in the mixture system. The actual pressure difference $\Delta p$ across the throttle valve is monitored and, in the case of an excessively high pressure difference, the throttle element is partially closed until the actual pressure difference $\Delta p$ reaches a desired value.

In conjunction with the method according to a disclosed embodiment, it can be advantageous if a) a threshold value $\Delta p\_tv$ and/or a target value $\Delta p\_target$ for the pressure difference $\Delta p$ across the throttle valve is predefined;

b) the actual pressure difference $\Delta p$ across the throttle valve is determined;

c) the attainment of the threshold value $\Delta p\_tv$ or a deviation from the target pressure difference $\Delta p\_target$ is determined;

d) the position of the throttle element is varied as a function of the ratio between the actual pressure difference $\Delta p$ and the threshold value $\Delta p\_tv$ or the target pressure difference $\Delta p\_target$. A resolution of 50 mbar for the actual pressure difference $\Delta p$ with a control frequency of 10/min is adequate here.

The use of a target value or of a threshold value is discretionary, and these are to be regarded as equivalent. The threshold value is, strictly speaking, nothing other than a target threshold value, upon the attainment of which the regulation of the throttle element commences.

Furthermore, it can also be advantageous if, as an alternative to step d), a fixed or non-variable exhaust-gas aperture is utilized in the exhaust gas system as a throttle element, the opening cross section of which exhaust-gas aperture is, depending on the ratio between the actual pressure difference $\Delta p$ and the threshold value $\Delta p\_tv$ or the target pressure difference $\Delta p\_target$, selected to be of such a size that the desired target pressure difference $\Delta p\_target$ across the throttle valve is achieved. In the case of a known and consistent gas composition and a very constant intake temperature, it is also possible for an exhaust-gas aperture to be provided which is adapted to these conditions, which exhaust-gas aperture is inserted between two flanges of the exhaust-gas system. However, in the event of a significant change in the gas composition, it would have to be exchanged in a suitable manner. The regulating elements or control elements are thus not required. The detection of the actual pressure difference is however of importance in any case.

It may also be advantageous if between 50 mbar and 400 mbar, in particular of 300 mbar, is set as the target value $\Delta p\_target$, and/or a if 200 mbar to 400 mbar is set as the threshold value $\Delta p\_tv$. The greater the upper threshold value is, the greater is the reserve for load alteration. Equally, the margin with respect to the surge line is correspondingly small. A lower threshold of below 50 mbar has the effect, in practical terms, that the throttle element always remains open.

BRIEF DESCRIPTION OF THE DRAWINGS

Further advantages and details of embodiments of the disclosure are explained in the patent claims and in the description and are illustrated in the figures, in which:

DETAILED DESCRIPTION

Figure 1:
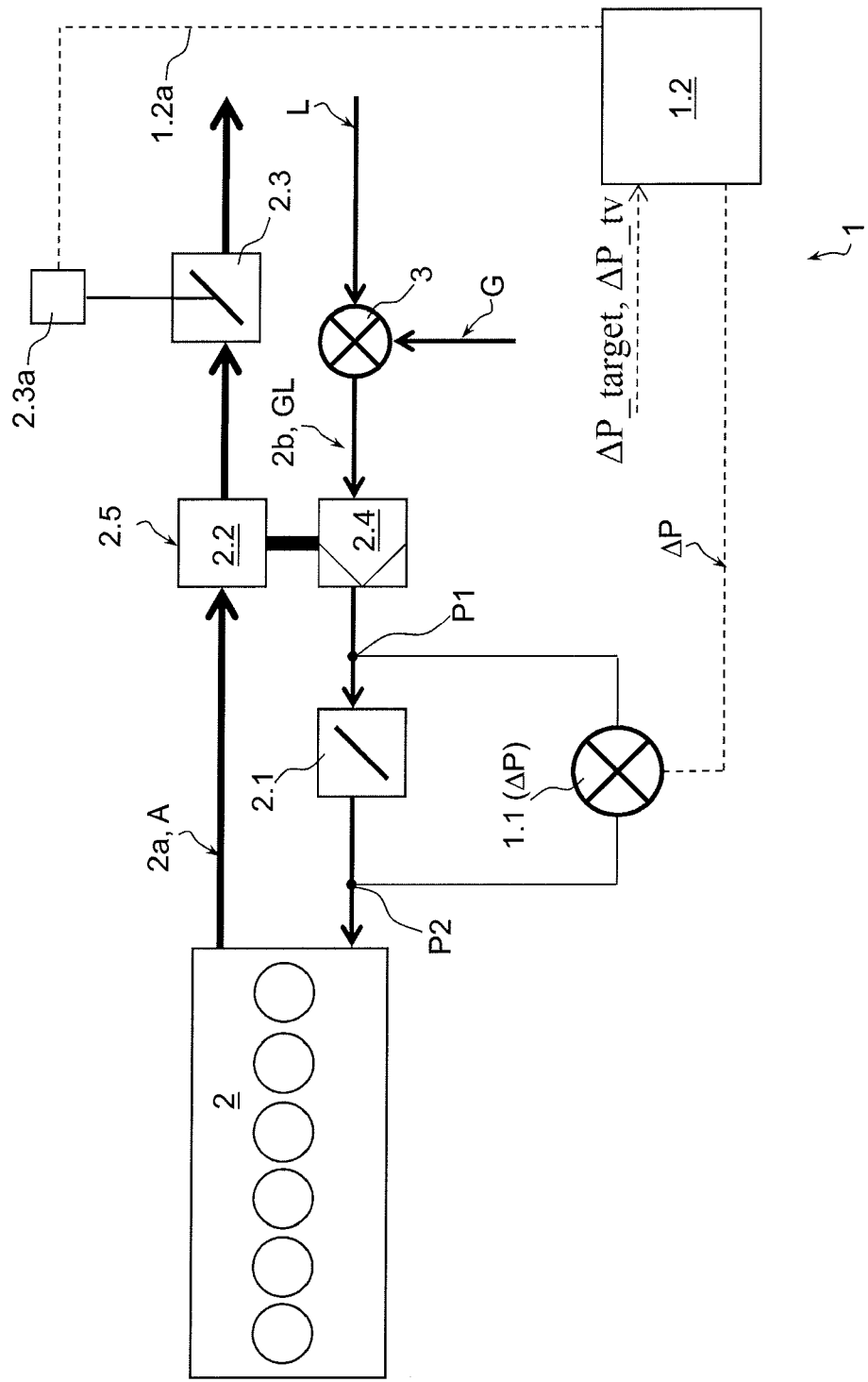
FIG. 1 shows a diagrammatic sketch of the protective device.

The spark-ignition gas engine 2 depicted in FIG. 1 includes an exhaust gas system 2a having a turbine 2.2 of an exhaust-gas turbocharger 2.5 and a throttle element (exhaust throttle butterfly valve) 2.3 which follows said turbine as viewed in the flow direction of an exhaust gas A. Furthermore, a mixture system 2b for fresh air L and gas G having a charge-air compressor and/or a mixture compressor 2.4 of the exhaust-gas turbocharger 2.5 is provided, to which a throttle valve 2.1 connects in the flow direction of the gas-air mixture GL. The fresh air L and the gas G are mixed at a mixing point 3.

In the region of the throttle valve 2.1, a detection unit 1.1 having two pressure sensors P1, P2 is provided as part of the protective device 1, by which an actual pressure difference $\Delta p$ across the throttle valve 2.1, that is to say upstream and downstream of the throttle valve 2.1, is detectable. The actual pressure difference $\Delta p$ is calculated by a control unit 1.2, such that the position of the throttle element 2.3 is variable by the control unit 1.2 as a function of this actual pressure difference $\Delta p$.

For this purpose, the throttle element 2.3 includes an actuator 2.3a, which functions electrically, hydraulically or pneumatically.

The pressure difference $\Delta p$ across the throttle valve 2.1 is monitored, wherein, in the case of an excessively high pressure difference $\Delta p$, the throttle element 2.3 is partially closed until the pressure difference $\Delta p$ has fallen to a desired value.

For this purpose, a threshold value Δp_tv and/or a target pressure difference Δp_target for the pressure difference Δp across the throttle valve 2.1 can be predefined for the control unit 1.2, which compares it with the actual pressure difference Δp across the throttle valve 2.1. If the threshold value Δp_tv is attained or if the target pressure difference Δp_target is exceeded, the control unit 1.2 transmits a signal via a control line 1.2a to the actuator 2.3a, so that the position of the throttle element 2.3 is thus varied such that the throughflow cross section is reduced, and consequently the exhaust-gas back pressure at the turbine outlet of the exhaust-gas turbocharger 2.5 is increased.

The throughflow cross section of the throttle element 2.3 is accordingly set such that an attainment of the threshold value Δp_tv, or an exceedance of the target pressure difference Δp_target, is prevented.

Figure 2:
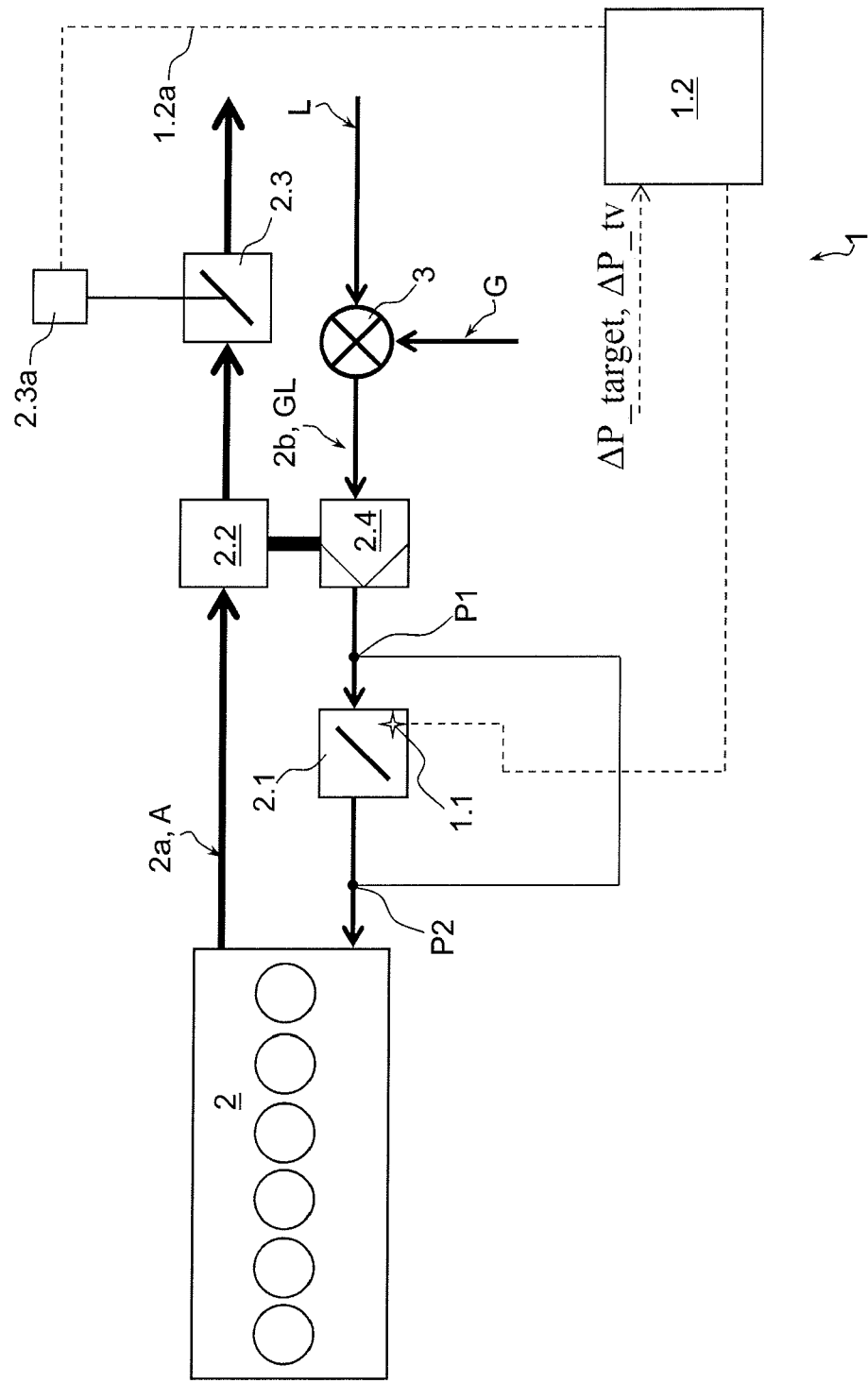
FIG. 2 shows an alternative embodiment.

In FIG. 2, a sensor unit for determining the position of the throttle valve 2.1 is provided as the detection unit 1.1. The presently prevailing actual pressure difference Δp can be derived from the position of the throttle valve 2.1. This is performed by a function stored in the control unit 1.2.

REFERENCE NUMERAL LIST

1 Protective device
1.1 Detection unit
1.2 Control unit
1.2a Control line
2 Spark-ignition gas engine
2.1 Throttle valve
2.2 Turbine of 2.5
2.3 Throttle element, exhaust-gas valve, exhaust-gas slide valve, exhaust-gas aperture
2.3a Actuator
2.4 Charge-air compressor and/or mixture compressor
2.5 Exhaust-gas turbocharger
2a Exhaust gas system
2b Mixture system
3 Mixing point
A Exhaust gas
Δp Actual pressure difference
Δp_target Target pressure difference
Δp_tv Threshold value of the pressure difference
G Gas
GL Gas-air mixture
L Air, fresh air
P1 Pressure sensor
P2 Pressure sensor

The invention claimed is:

1. A method of regulating an exhaust throttle valve, positioned downstream of a turbine of an exhaust-gas turbocharger, of a spark-ignition gas engine having an intake throttle valve in a mixture system, comprising monitoring a pressure difference across the intake throttle valve of the engine while the engine is running and, if the pressure difference equals or exceeds a predetermined amount, partially closing the exhaust throttle valve until the pressure difference has fallen to less than the predetermined amount.

2. The method according to claim 1, including a) predefining a threshold value or a target value for the pressure difference across the intake throttle valve; b) determining a pressure difference across the intake throttle valve; c) determining an attainment of the threshold value or a deviation from the target pressure difference; and d) varying a position of the exhaust throttle valve as a function of a ratio between the pressure difference and the threshold value or the target pressure difference.

3. The method according to claim 1, wherein the target value is between 50 mbar and 400 mbar or between 200 mbar and 400 mbar.

4. The method according to claim 3, wherein the target value is 300 mbar.

5. A spark-ignition gas engine having:
an intake throttle valve for a gas-air mixture,
an exhaust-gas turbocharger which includes a turbine, and
a protective device comprising:
an exhaust throttle valve positioned downstream of the turbine with respect to a flow direction of exhaust gas,
a detection unit; and
a control unit;
wherein
the detection unit detects a pressure difference across the intake throttle valve, and
the control unit varies a position of the exhaust throttle valve as a function of the detected pressure difference.

6. The spark-ignition gas engine according to claim 1, wherein the detection unit includes two pressure sensors for determining the pressure difference across the intake throttle valve.

7. The spark-ignition gas engine according to claim 1, further including an actuator, and wherein the exhaust throttle valve is formed as a butterfly valve or a slide valve.

8. The protective device according to claim 1, wherein the detection unit comprises a sensor configured to detect a position of the intake throttle valve.

9. An exhaust gas system of a spark-ignition gas engine having an exhaust-gas turbocharger which includes a turbine and having a mixture system of a spark-ignition gas engine with a mixture compressor for a gas-air mixture, which is coupled to the turbine, and having an intake throttle valve which is provided downstream of a mixture compressor with respect to a flow direction, and having a protective device which comprises:
an exhaust throttle valve positioned downstream of the turbine with respect to a flow direction of exhaust gas,
a detection unit; and
a control unit;
wherein
the detection unit detects a pressure difference across the intake throttle valve, and
the control unit varies a position of the exhaust throttle valve as a function of the detected pressure difference.

10. A system of a spark-ignition gas engine comprising:
a first path carrying exhaust away from the spark-ignition gas engine;
a second path carrying a gas-air mixture to the spark-ignition gas engine;
a turbine in the first path having a turbine inlet and a turbine outlet;
an exhaust throttle valve in the first path downstream of the turbine outlet;
a compressor in the second path operatively connected to the turbine;
an intake throttle valve in the second path between the compressor and the spark-ignition gas engine;
at least one sensor configured to produce an output indicative of at least one of a pressure difference across the intake throttle valve and a position of the intake throttle valve; and
a controller operatively connected to the at least one sensor and to the exhaust throttle valve, the controller being configured to control the position of the exhaust throttle valve based on the output of the at least one sensor.

11. The system according to claim 10, wherein the exhaust throttle valve comprises a slide valve or a butterfly valve.

12. The system according to claim 10, wherein the at least one sensor comprises a first pressure sensor in the second path upstream of the intake throttle valve and a second pressure sensor in the second path downstream of the intake throttle valve.

13. The system according to claim 10, wherein the at least one sensor is configured to measure the position of the intake throttle valve.

* * * * *